(12) United States Patent
Yoshii et al.

(10) Patent No.: US 7,004,534 B2
(45) Date of Patent: Feb. 28, 2006

(54) VEHICLE FRONT-BODY STRUCTURE

(75) Inventors: Noboru Yoshii, Aki-gun (JP); Yasunori Kageyama, Aki-gun (JP); Hiroshi Sogabe, Aki-gun (JP); Katsutoshi Nakamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/929,599

(22) Filed: Aug. 31, 2004

(65) Prior Publication Data

US 2005/0067859 A1    Mar. 31, 2005

(30) Foreign Application Priority Data

Sep. 29, 2003 (JP) .............................. 2003-336636

(51) Int. Cl.
B62D 25/08 (2006.01)
(52) U.S. Cl. ...................................... 296/192; 180/274
(58) Field of Classification Search ................ 296/192, 296/203.02, 203.01
See application file for complete search history.

(56) References Cited

U.S. PATENT DOCUMENTS

| 3,843,194 | A | * | 10/1974 | Yamada | 296/192 |
|---|---|---|---|---|---|
| 4,721,032 | A | * | 1/1988 | Sakamoto | 454/146 |
| 4,909,566 | A | * | 3/1990 | Hashimoto et al. | 296/192 |
| 4,943,102 | A | * | 7/1990 | Hamamoto et al. | 296/192 |
| 4,976,491 | A | | 12/1990 | Hashimoto et al. | |
| 5,005,897 | A | * | 4/1991 | Endo et al. | 296/192 |
| 6,193,305 | B1 | * | 2/2001 | Takahashi | 296/192 |
| 6,322,440 | B1 | * | 11/2001 | Nakatani | 296/192 |
| 6,565,148 | B1 | * | 5/2003 | Teramoto et al. | 296/192 |
| 6,637,798 | B1 | * | 10/2003 | Hoshikawa et al. | 296/96.17 |
| 6,880,666 | B1 | * | 4/2005 | Kikuchi et al. | 180/274 |
| 2003/0159875 | A1 | * | 8/2003 | Sato et al. | 180/274 |
| 2003/0178873 | A1 | * | 9/2003 | Kato et al. | 296/192 |
| 2003/0192731 | A1 | * | 10/2003 | Kikuchi et al. | 180/274 |
| 2004/0074248 | A1 | * | 4/2004 | Tanaka et al. | 62/244 |
| 2005/0121890 | A1 | * | 6/2005 | Kong | 280/732 |

(Continued)

FOREIGN PATENT DOCUMENTS

EP      1346903 A2     9/2003

(Continued)

OTHER PUBLICATIONS

Nobuhiro Komatsu, "*Japanese Unexamined Utility Model Publication No. 62-58260*", with partial translation, (Apr. 10, 1987).

(Continued)

*Primary Examiner*—Kiran B. Patel
(74) *Attorney, Agent, or Firm*—Nixon Peabody LLP; Donald R. Studebaker (57) ABSTRACT

A structure of a cowl and its vicinities is provided which is capable of, even in a vehicle which has an open cowl structure, using the open cowl structure as a member which connects the right and left bodies of the vehicle, and at the same time, realizing a structure that is useful for protecting a pedestrian. At the end part of a cowl 12 in the vehicle rear direction, one end of a dash upper panel 16 is connected; its other end extends below the cowl 12 and in the vehicle front direction; from its middle part in the vehicle front-and-rear directions, a cowl cross-member lower 9 extends in the vehicle upper direction; at the upper-end part of the cowl cross-member lower 9, a protrusion portion 25 is formed; and by welding it to a cowl cross-member upper 10, a closed-section portion 27 is formed between them. Herein, the cowl cross-member upper 10 is thinner than the cowl cross-member lower 9.

10 Claims, 4 Drawing Sheets

U.S. PATENT DOCUMENTS

2005/0134089 A1 * 6/2005 Borkowski et al. ......... 296/192

FOREIGN PATENT DOCUMENTS

JP 2004155351 A * 6/2004

OTHER PUBLICATIONS

European Search Report dated Dec. 3, 2004 for application No. 04020541.1.

* cited by examiner

VEHICLE FRONT-BODY STRUCTURE

BACKGROUND OF THE INVENTION

1. Field of the Invention

This invention relates to a vehicle front-body structure, specifically, the structure of a cowl portion which is formed forward from the part beneath a windshield and of its vicinities.

2. Description of the Related Art

Conventionally, in a cowl panel which forms the part beneath a windshield, its rear end is connected to one end of a dash upper panel. This dash upper panel extends in the vehicle-front direction below the cowl panel. Its front-end part extends in the vehicle-upper direction. These cowl panel and dash upper panel forms an open cowl structure which has an opening in the vehicle-upper direction.

According to the open cowl structure, the cowl panel and its vicinities can be used as an air box through which air is introduced for the air conditioning of a vehicle cabin. Therefore, in recent years, this structure has generally been used for vehicles.

However, this open cowl structure, if seen from its sides, has an open section a part of which is open. Therefore, if it is used as a member which connects the right and left bodies of a vehicle, for example, wheel aprons, there is a disadvantage in which its stiffness becomes insufficient.

Accordingly, aiming at resolving this disadvantage, as described in Patent Document 1 (Japanese Patent Laid-Open No. 62-58260 specification), a front-wall part which extends upward is formed at the front-end part of a dash upper panel. Thus, a closed-section member which extends in the vehicle-width directions is formed by the upper-end part of the dash upper panel and a front-wall part of a dash lower panel.

According to this configuration, the closed-section member which extends in the vehicle-width directions is formed. This makes it possible to use this structure as the member which connects the vehicle right and left bodies, even though it is an open cowl structure.

On the other hand, attention has recently been paid to protecting a pedestrian when the pedestrian is hit by a vehicle. This is realized by reducing the value of impact energy which is given to the pedestrian by the vehicle. Thus, automobile manufacturers have been designing vehicles from the viewpoint of pedestrian protection.

When a vehicle hits a pedestrian, it is known that the following problem arises, especially. When the vehicle's front part has come into contact with the pedestrian, the pedestrian's head knocks against the hood panel which covers the engine room. This makes an impact on the pedestrian's head.

In order to reduce the value of impact energy on the head, when the load has been given on the hood panel, the hood panel needs to be deformed in the vehicle-lower direction. The deformation of the hood panel helps absorb load energy. In short, a structure is required in which the displacement of a hood panel can be permitted.

However, in a vehicle which has a general open cowl structure, at the rear-end part of its hood panel, the upward-extending part of the front-end part of the dash upper panel is located under the hood panel. When a load-is applied from above, the hood panel moves down. Then, the hood panel comes into contact with the front-end part of the dash upper panel. At this time, it is difficult that the load given from above the vehicle deforms the dash upper panel. This is because a conventional dash upper panel is a relatively thick plate. As a result, the hood panel is prevented from being displaced downward, thereby heightening the value of impact energy on the pedestrian's head.

Furthermore, a conventional dash upper panel is shaped that its front-end part extends upward substantially perpendicularly. Therefore, in respect of the structure, it is strong against a load applied from above a vehicle. As a result, the value of impact energy on the head heightens further.

Moreover, according to the configuration of the above described Patent Document 1, at the rear-end part of the hood panel, the closed-section member which is formed by the dash upper panel and the dash lower panel is located under the hood panel. When a load is applied from above, the hood panel moves down. Then, the closed-section member which extends in the vehicle-width directions comes into contact with the hood panel. At this time, the hood panel is prevented from being displaced downward because the dash upper panel is a relatively thick plate which is similar to the dash lower panel. As a result, the value of impact energy on the head heightens.

In addition, the upper-end part of this stiff closed-section member extends upward substantially perpendicularly. Therefore, in respect of the structure, it is strong against a load applied from above a vehicle. As a result, the hood panel is largely prevented from being displaced downward. This further heightens the value of impact energy on the head.

In brief, in a vehicle which has an open cowl structure, at the rear-end part of its hood panel, the value of impact energy on the pedestrian's head heightens. As can be seen in the configuration of the Patent Document 1, if a closed-section member which extends in the vehicle-width directions is formed, the open cowl structure can be used as a member which connects the right and left bodies of the vehicle. However, at the rear-end part of the hood panel, the value of impact energy on the head heightens.

BRIEF SUMMARY OF THE INVENTION

In view of the above described problems, it is an object of the present invention to provide a structure of a cowl and its vicinities which is capable of, even in a vehicle which has an open cowl structure, using the open cowl structure as a member which connects the right and left bodies of the vehicle, and at the same time, realizing a structure that is useful for protecting a pedestrian.

In order to attain the above described object, the present invention is configured as described below. The vehicle front-body structure according to a first aspect of the present invention, which includes: a cowl panel which is located over a dash panel that is disposed in the front of a vehicle cabin, extends in the vehicle-width directions, and forms the part beneath a windshield; a dash upper panel which is connected, at one end thereof, to the vehicle-rear part of the cowl panel, and extends, at the other end thereof, in a vehicle-lower and front direction from the cowl panel; a cowl cross member which extends in a vehicle upper and front direction from the vehicle-front part of the dash upper panel, and forms an opening portion that opens in the vehicle-upper direction, together with the cowl panel; and a hood panel which extends forward from above the cowl cross member, wherein: the cowl cross member has a cowl cross-member lower which extends in a vehicle-upper and front direction from the vehicle-front part of the dash upper panel and forms the cross-member lower part, a cowl cross-member upper which extends in the vehicle-upper direction from the cowl cross-member lower and forms the cross-member upper part; the cowl cross-member upper and the cowl cross-member lower are connected so that a closed section is formed between both the cowl cross-member upper and the cowl cross-member lower; and the cowl cross-member upper is made of a weaker material than the cowl cross-member lower.

These and other objects, features and advantages of the present invention will become more apparent upon reading of the following detailed description along with the accompanied drawings.

DETAILED DESCRIPTION OF INVENTION

Figure 1:
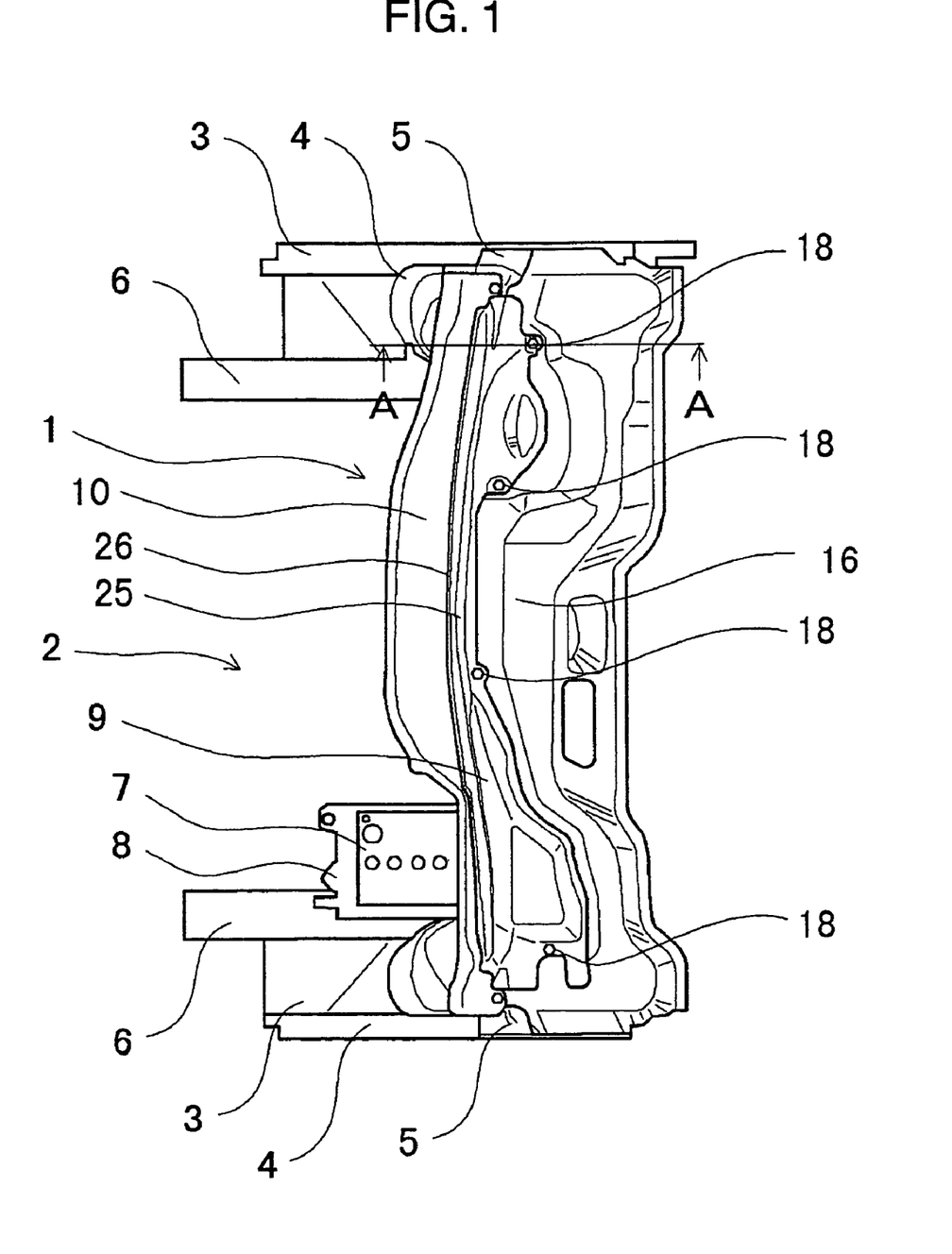
FIG. 1 is a plan view of a vehicle front-body structure according to the present invention.
Figure 2:
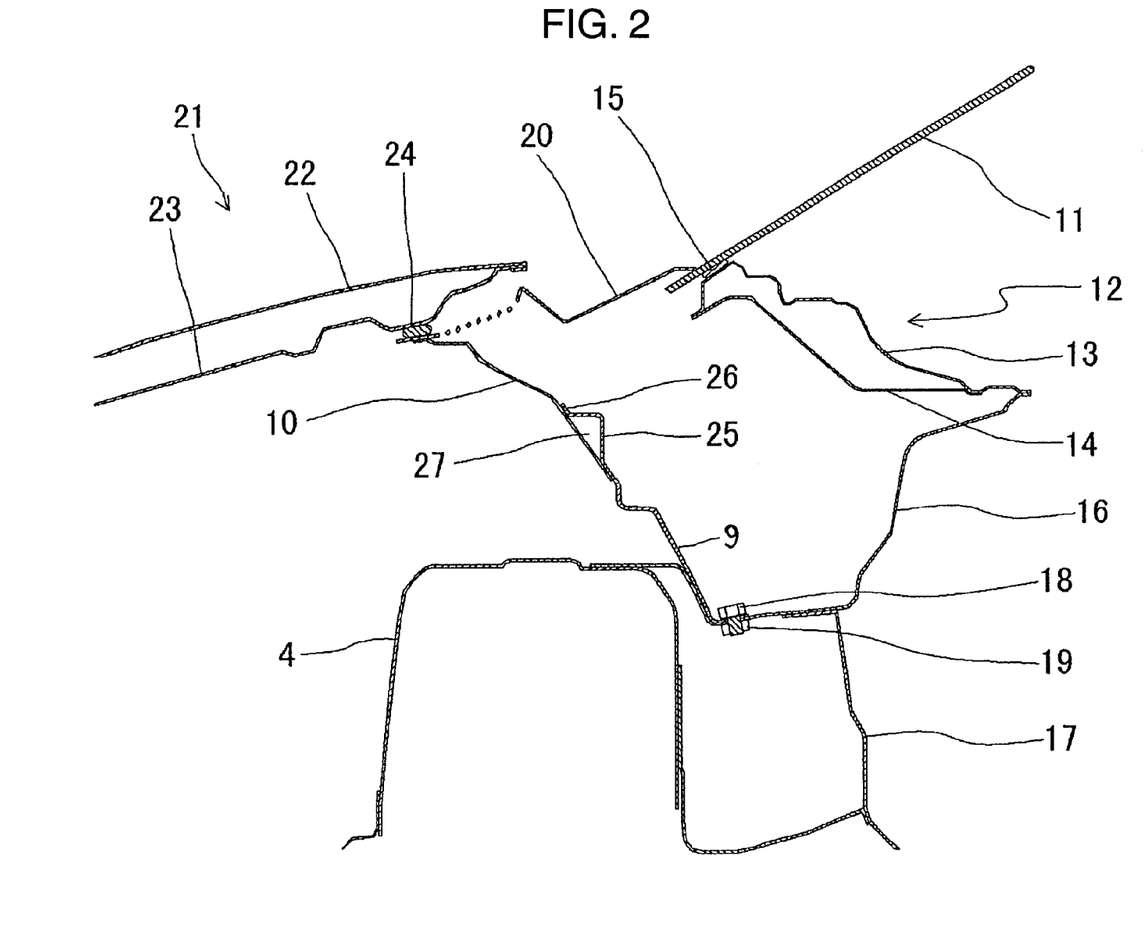
FIG. 2 is a sectional view of the vehicle front-body structure, seen along a line A—A in FIG. 1.
Figure 3:
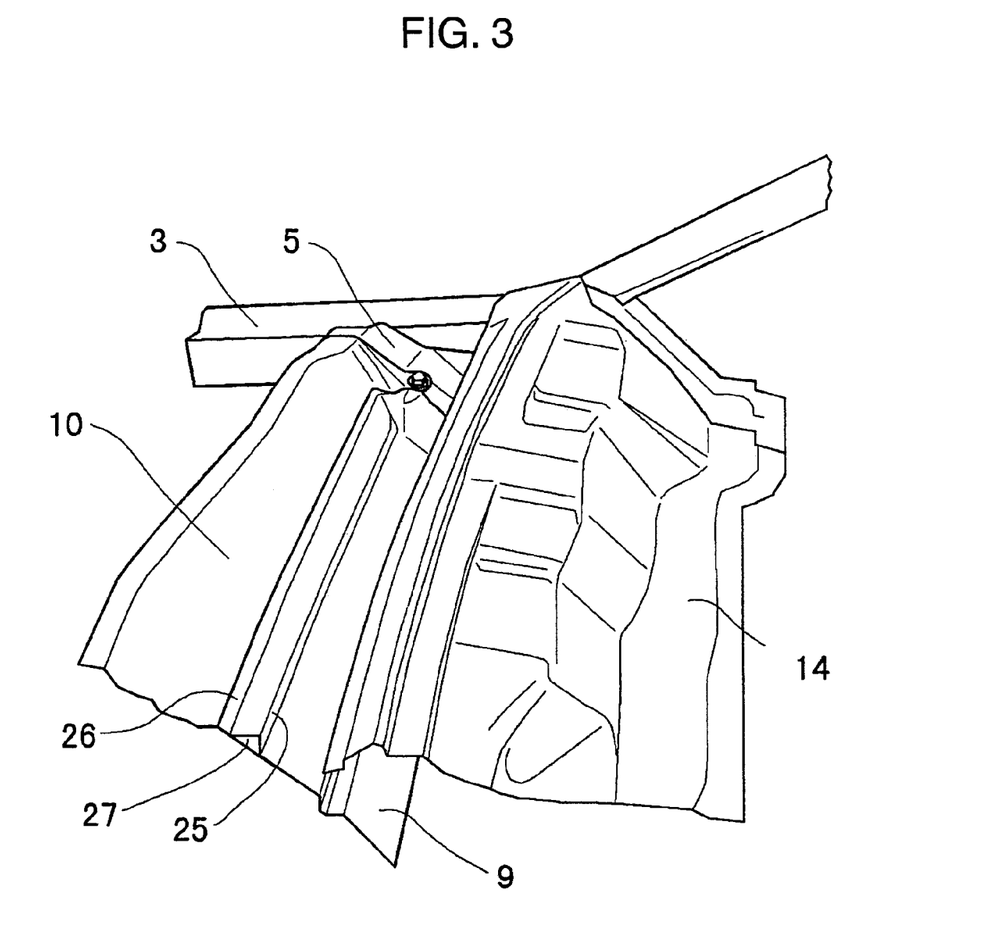
FIG. 3 is an enlarged perspective view of the main part of the vehicle front-body structure according to the present invention.
Figure 4:
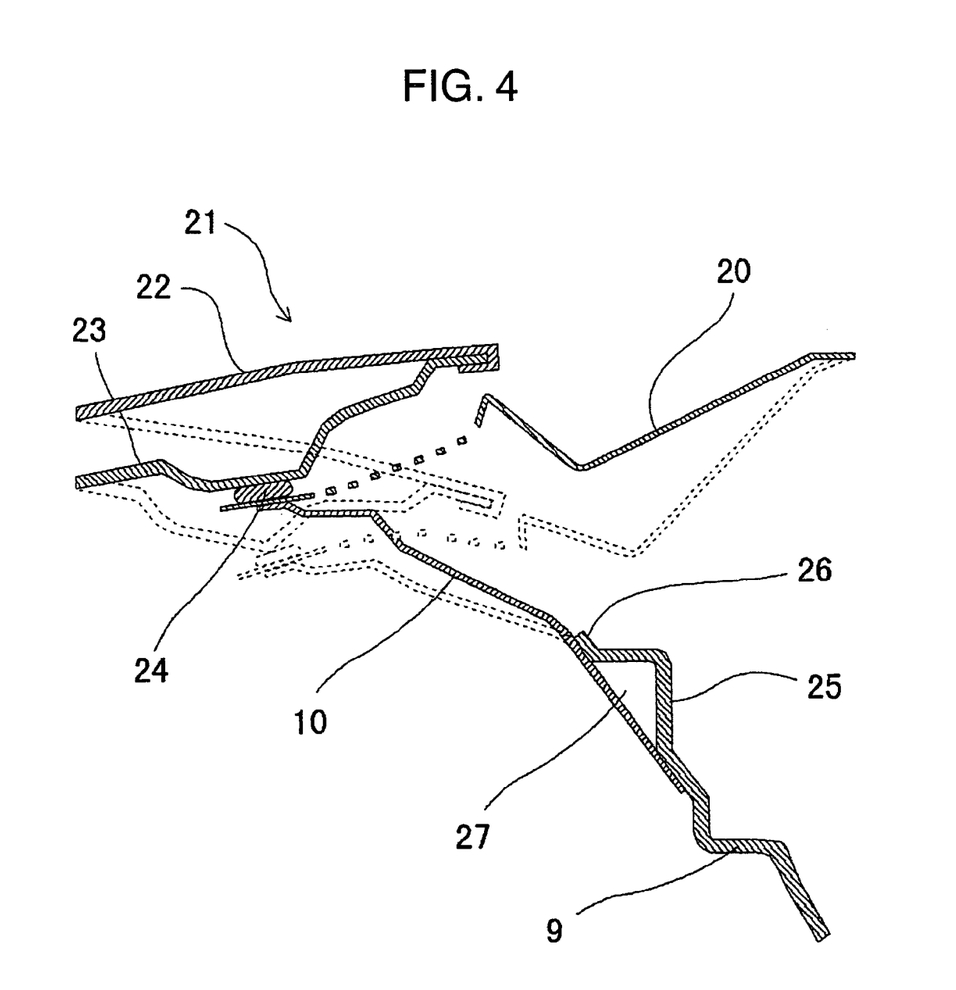
FIG. 4 is an enlarged sectional view of the main part of the vehicle front-body structure according to the present invention.

Hereinafter, description will be given of the vehicle front-body structure according to the embodiment of the present invention. FIG. 1 is a plan view of the vehicle front-body structure according to the present invention. FIG. 2 is a sectional view, seen along a line A—A in FIG. 1. FIG. 3 is an enlarged perspective view of its main part. FIG. 4 is an enlarged sectional view of the main part.

As shown in FIG. 1, in the vehicle front-body structure which the structure of a cowl and its vicinities according to the present invention is applied to, a cowl cross member 1 is disposed over a suspension tower 4 which fixes the upper part of a suspension of a vehicle, so that it connects, in the vehicle-width directions, right and left wheel aprons 3 which configure both right and left side-walls of an engine room 2 of the vehicle.

In detail, the cowl cross member 1 is connected to the wheel aprons 3 via connection members 5.

Herein, the suspension tower 4 is connected to the wheel apron 3, and a front frame 6 which extends in the vehicle front-and-rear directions.

Above the left-hand front frame 6, a battery case 8 is disposed which houses a battery 7 that supplies electric power to electrical devices attached to the vehicle.

The cowl cross member 1 is configured by a cowl cross-member lower 9 which forms its lower part, and a cowl cross-member upper 10 which forms its upper part.

Although it is not shown expediently in FIG. 1, a windshield 11 is disposed in the vehicle rear direction from the cowl cross member 1, as shown in FIG. 2. The lower part of this windshield 11 is supported with a cowl 12. Although it is not shown expediently in FIG. 1, this cowl 12 is configured by a cowl upper member 13 which forms its upper part, and a cowl lower member 14 which forms its lower part. It has a closed-section structure if seen from the vehicle sides. The windshield 11 is fixed via an adhesive 15 to the front part of the cowl upper member 13.

To the rear-end of the cowl upper member 13, a dash upper panel 16 is connected which extends in a vehicle lower and front direction from the cowl 12. A dash lower panel 17 is connected to substantially the middle part in the vehicle front-and-rear directions of the dash upper panel 16.

It extends in the vehicle lower direction, and partitions off the engine room 2 and a vehicle cabin. To a part of the dash upper panel 16 in the vehicle front direction from that connection part, the lower part of the cowl cross-member lower 9 which forms the lower part of the cowl cross member 1 is connected by means of a bolt 18 and a nut 19.

The front-end part of the dash upper panel 16 is connected to the upper part of the suspension tower 4.

The cowl lower member 14, the dash upper panel 16, the cowl cross-member lower 9 and the cowl cross-member upper 10 form an open cowl structure which has an opened-section structure if seen from the vehicle sides. Therefore, the space formed by this cowl structure can be used as an air box through which air is introduced for the air conditioning of the vehicle cabin.

The opening portion formed between the cowl cross-member upper 10 and the windshield 11 is covered with a cowl grille 20.

Above the cowl cross-member upper 10, a hood panel 21 is disposed which covers the engine room 2 from above. This hood panel 21 is configured by a hood outer panel 22 which forms its upper part, and a hood inner panel 23 which forms its lower part. Herein, the hood panel 21 is fixed on the vehicle body so that it can be opened and closed on a hood hinge (not shown) which is disposed in the upper part of the wheel apron 3.

The hood inner panel 23 is connected to the cowl cross-member upper 10, via the cowl grille 20 and an elastic seal member 24 which is disposed at the front-end upper part of the cowl grille 20.

Herein, the seal member 24 is provided so that rainwater, or soot and dust, is prevented from coming into the engine room 2.

Next, description will be given in further detail with reference to FIG. 3 and FIG. 4. These figures show the structure of the cowl cross member and its vicinities. Specifically, they are a perspective view and a sectional view, focusing on the relation between the cowl cross-member upper 10 and the cowl cross-member lower 9. Herein, in FIG. 3, the cowl grille 20 and the cowl lower member 14 are omitted expediently.

In the upper-end part of the cowl cross-member lower 9 which extends from its connection part with the dash upper panel 16, a protrusion portion 25 is formed which has a substantially overturned-L shape if seen from the vehicle sides. At its front end, a flange portion 26 is formed. The rear-end part of the cowl cross-member upper 10 which has a substantially straight-line shape is fixed by welding on the flange portion 26 and the rear part of the protrusion portion 25.

Thereby, between the rear-end part of the cowl cross-member upper 10 and the protrusion portion 25 of the cowl cross-member lower 9, a closed-section portion 27 is formed which has a substantially triangular shape if seen from the vehicle sides.

This closed-section portion 27 extends in the vehicle-width directions, so that it connects the right and left wheel aprons 3 substantially in the vehicle-width directions. This makes the cowl cross member 1 stiffer, thus leading to a greater stiffness of the front part of the vehicle.

Herein, as shown in FIG. 1, this closed-section portion 27 is configured to extend substantially straight in the vehicle-width directions. Therefore, compared with the case where it is largely bent in the vehicle rear direction for the purpose of the maintenance of auxiliary machinery such as the battery 7, or the prevention of interference which may be caused in their layout, the right and left wheel aprons 3 can be connected directly and certainly. This certainly makes the vehicle body stiffer.

Furthermore, the cowl cross-member upper 10 and the cowl cross-member lower 9 are configured to have a different thickness from each other. In further detail, the cowl cross-member upper 10 is designed to be thinner than the cowl cross-member lower 9. Specifically, the cowl cross-member upper 10 has a thickness of approximately 0.7 mm, while the cowl cross-member lower 9 has a thickness of some 1.4 mm. In other words, the thickness of the cowl cross-member upper 10 is designed to be about half of that of the cowl cross-member lower 9.

Thereby, the cowl cross-member upper 10 becomes weaker than the cowl cross-member lower 9. As shown by a calculated line in FIG. 4, even when the hood panel 21 is displaced downward at the time when a load is applied from above, the cowl cross-member upper 10 will not hinder the hood panel 21 from moving down. In short, it can be displaced downward together with the hood panel 21.

Accordingly, in addition to a greater stiffness of the front part of the vehicle by using the closed-section portion 27, when a load is applied from above the vehicle body, for example, when the head of a pedestrian bumps against the hood panel 21, the bumping energy is absorbed more efficiently. This helps protect the pedestrian.

Furthermore, not only the fact that the cowl cross-member upper 10 is thinner than the cowl cross-member lower 9, but also the fact that the stiffness of the closed-section portion 27 is extremely great, can make a big difference in strength between the cowl cross-member upper 10 and the flange portion 26 where the cowl cross-member upper 10 and the cowl cross-member lower 9 are connected. Therefore, when a load is applied on the cowl cross-member upper 10 from above, for example, from the hood panel 21, the cowl cross-member upper 10 will be bent in the vehicle front direction from the front end of the closed-section portion 27, or the flange portion 26.

Thereby, when a load is applied from above, for example, when the head of a pedestrian bumps against the hood panel 21, the deformation characteristic of the cowl cross-member upper 10 becomes easier to project and design. This allows the energy at the time of a bump to be certainly absorbed.

Moreover, the cowl cross-member upper 10 is configured, if seen from the vehicle sides, to incline in the vehicle front direction over the axis which extends in the vehicle up-and-down directions. Specifically, according to this embodiment, it is inclined forward at approximately 85 degrees.

Thereby, even when a load is applied from above, for example, even when the head of a pedestrian bumps against the hood panel 21, the cowl cross-member upper 10 can be more easily deformed by the hood panel 21 than in the case where the cowl cross-member upper 10 extends upward substantially perpendicularly. Therefore, the energy can be absorbed more efficiently.

In addition, the cowl cross-member upper 10 and the cowl cross-member lower 9 are made of the same steel material.

Thereby, troubles which may be caused when the cowl cross-member upper 10 and the cowl cross-member lower 9 are connected in the case where they are made of a different material from each other, for example, a welding trouble, can be avoided.

Furthermore, the closed-section portion 27 is configured, as shown in FIG. 2, to be located above the suspension tower 4. This stiffens the suspension tower 4 via the wheel apron 3. Especially, the suspension tower 4 can be prevented from falling inward in the vehicle-width directions, or falling inward on the side of the engine room 2. Besides, the attachment stiffness of the suspension itself can also be made greater.

Herein, the dash upper panel 16 connected to the lower end of the cowl cross member 1 is connected, as shown in FIG. 2, to the upper part of the suspension tower 4. Therefore, even at the lower end of the cowl cross member 1, the suspension tower 4 becomes stiffer via the dash upper panel 16. Especially, the suspension tower 4 can be prevented from falling down in the vehicle front-and-rear directions. Besides, the attachment stiffness of the suspension itself can also be made greater.

Hereinbefore, the description has been given of the vehicle front-body structure according to the preferred embodiment of the present invention. However, the present invention is not limited to this embodiment. Needless to say, diverse variations are possible unless they depart from the scope of the present invention.

For example, the closed-section portion 27 which is formed between the cowl cross-member upper 10 and the cowl cross-member lower 9 is not necessarily shaped like a substantially triangle. It may also has a substantially semicircular shape, or a polygonal shape.

Furthermore, the cowl cross-member upper 10 and the cowl cross-member lower 9 have a different thickness from each other, so that the former becomes weaker than the latter. However, they may also be made of a different material, such as the combination of aluminum and steel.

In sum, the present invention is configured as described below. The vehicle front-body structure according to a first aspect of the present invention, which includes: a cowl panel which is located over a dash panel that is disposed in the front of a vehicle cabin, extends in the vehicle-width directions, and forms the part beneath a windshield; a dash upper panel which is connected, at one end thereof, to the vehicle-rear part of the cowl panel, and extends, at the other end thereof, in a vehicle-lower and front direction from the cowl panel; a cowl cross member which extends in a vehicle upper and front direction from the vehicle-front part of the dash upper panel, and forms an opening portion that opens in the vehicle-upper direction, together with the cowl panel; and a hood panel which extends forward from above the cowl cross member, wherein: the cowl cross member has a cowl cross-member lower which extends in a vehicle-upper and front direction from the vehicle-front part of the dash upper panel and forms the cross-member lower part, a cowl cross-member upper which extends in the vehicle-upper direction from the cowl cross-member lower and forms the cross-member upper part; the cowl cross-member upper and the cowl cross-member lower are connected so that a closed section is formed between both the cowl cross-member upper and the cowl cross-member lower; and the cowl cross-member upper is made of a weaker material than the cowl cross-member lower.

According to this configuration, the cowl cross member is disposed ahead of the dash upper panel, the cowl cross member is configured separately by the cowl cross-member upper and the cowl cross-member lower, and the cowl cross-member upper is a weaker member than the cowl cross-member lower. Therefore, when a load is given from above, the cowl cross-member upper will not hinder the hood panel from being deformed downward.

Furthermore, the closed section is formed between the cowl cross-member upper and the cowl cross-member lower. This allows the cowl cross member to keep its stiffness, even though the cowl cross-member upper is made of a weaker material than the cowl cross-member lower.

In other words, even in a vehicle which has an open cowl structure, a structure can be realized in which the value of impact energy on a pedestrian can be certainly reduced. Simultaneously, the open cowl structure can be used as a member which connects the right and left bodies of the vehicle.

Moreover, the weak cowl cross-member upper and the strong cowl cross-member lower are connected on the boundary of the closed section. Therefore, the weak cowl cross-member upper is deformed from the boundary with the upper-end part of the strong and firm cowl cross-member lower. This makes it easy to control the deformation characteristic of the cowl cross-member upper when a load is given from above. Thereby, when the vehicle hits a pedestrian, its energy can be surely absorbed.

The vehicle front-body structure according to a second aspect of the present invention, wherein in the vehicle front-body structure according to the first aspect, the cowl cross-member upper extends in a vehicle-upper and front direction from the cowl cross-member lower.

According to this configuration, the cowl cross-member upper extends in an oblique upper-and-front direction. Therefore, even if the hood panel is deformed when a load is given from above, the cowl cross-member upper is easy to deform downward. Thus, in addition to the advantages according to the first aspect, when a load is given from above, its capability of absorbing the impact can be further enhanced.

The vehicle front-body structure according to a third aspect of the present invention, wherein in the vehicle front-body structure according to the first or second aspect, the cowl cross-member upper is formed as a weaker member with a thinner panel than the cowl cross-member lower.

According to this configuration, the weak cowl cross-member upper can be formed simply by varying its thickness. Thus, in addition to the advantages according to the first or second aspect, compared with the case where the cowl cross-member upper is made of a different material from that of the cowl cross-member lower, the cowl cross-member upper can be made a weaker member than the cowl cross-member lower.

Furthermore, the cowl cross-member upper is made of the same material as the cowl cross-member lower, and thus, no difficulty arises in connecting them.

The vehicle front-body structure according to a fourth aspect of the present invention, wherein in the vehicle front-body structure according to any one of the first to third aspects, the closed section which is formed between the cowl cross-member upper and the cowl cross-member lower extends almost straight substantially between the vehicle right and left side-walls.

According to this configuration, the closed section extends almost straight substantially between the right and left bodies of the vehicle. Thus, in addition to the advantages according to the first to third aspects, compared with the case where the closed section is largely bent to evade its interference with auxiliary machinery such as a battery, it can connect directly and certainly the right and left bodies of the vehicle. As a result, the vehicle body can be certainly reinforced.

The vehicle front-body structure according to a fifth aspect of the present invention, wherein the closed section is located above a suspension tower.

According to this configuration, the closed section is configured to be located above the suspension tower. Thus, in addition to the advantages according to the first to fourth aspects, the suspension tower can be prevented from falling inward in the vehicle-width directions. Besides, the attachment stiffness of the suspension can also be made greater.

The vehicle front-body structure according to a sixth aspect of the present invention, wherein the vehicle-front part of the dash upper panel is connected to the suspension tower.

According to this configuration, the vehicle-front part of the dash upper panel is connected to the suspension tower. Thus, in addition to the advantages according to the first to fourth aspects, the suspension tower can be prevented from falling down in the vehicle front-and-rear directions. Besides, the attachment stiffness of the suspension can also be made greater.

According to the present invention, the structure of a cowl and its vicinities can be provided which is capable of, even in a vehicle which has an open cowl structure, using the open cowl structure as a member which connects the right and left bodies of the vehicle, and at the same time, realizing a structure that is useful for protecting a pedestrian.

This application is based on Japanese patent application serial No. 2003-336636, filed in Japan Patent Office on Sep. 29, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle front-body structure, which includes:
   a cowl panel which is located over a dash panel that is disposed in the front of a vehicle cabin, extends in the vehicle-width directions, and forms the part beneath a windshield;
   a dash upper panel which is connected, at one end thereof, to the vehicle-rear part of the cowl panel, and extends, at the other end thereof, in a vehicle-lower and front direction from the cowl panel;
   a cowl cross member which extends in a vehicle upper and front direction from the vehicle-front part of the dash upper panel, and forms an opening portion that opens in the vehicle-upper direction, together with the cowl panel; and
   a hood panel which extends forward from above the cowl cross member, wherein:
   the cowl cross member including:
     a cowl cross-member lower which extends in a vehicle-upper and front direction from the vehicle-front part of the dash upper panel and forms the cowl cross-member lower part, and
     a cowl cross-member upper which extends in the vehicle-upper direction from the cowl cross-member lower and forms the cowl cross-member upper part;
   the cowl cross-member upper and the cowl cross-member lower are connected so that a closed section is formed between both the cowl cross-member upper and the cowl cross-member lower; and
   the cowl cross-member upper is made of a weaker material than the cowl cross-member lower.

2. The vehicle front-body structure according to claim 1, wherein the cowl cross-member upper extends in a vehicle-upper and front direction from the cowl cross-member lower.

3. The vehicle front-body structure according to claim 1, wherein the cowl cross-member upper is formed as a weaker member with a thinner panel than the cowl cross-member lower.

4. The vehicle front-body structure according to claim 1, wherein the closed section which is formed between the cowl cross-member upper and the cowl cross-member lower extends almost straight substantially between the vehicle right and left side-walls.

5. The vehicle front-body structure according claim 1, wherein the closed section is located above a suspension tower.

6. The vehicle front-body structure according to claim 1, wherein the vehicle-front part of the dash upper panel is connected to the suspension tower.

7. The vehicle front-body structure according to claim 1, wherein said closed-section portion is formed which has a substantially triangular shape, seen from the vehicle sides.

8. The vehicle front-body structure according to claim 1, wherein the sectional modulus of the closed-section portion is greater than that of the lower part of the cowl cross-member upper and that of the upper part of the cowl cross-member lower.

9. The vehicle front-body structure according to claim 1, wherein a protrusion portion having a substantially overturned-L shape, seen from the vehicle sides is formed on the upper end of the cowl cross-member lower and a flange portion is formed at the top end of the protrusion and the lower-end part of the cowl cross-member upper having a substantially straight-line shape is fixed on the flange portion and the lower part of the protrusion portion of the cowl cross-member lower such that said closed-section portion is formed as an enclosed space between the lower-end part of the cowl cross-member upper and the protrusion portion of the cowl cross-member lower and the closed-section portion has a substantially triangular shape, seen from the vehicle sides.

10. The vehicle front-body structure according to claim 1, wherein the cowl cross-member upper and the cowl cross-member lower are made of the same material and the thickness of the cowl cross-member upper is set substantially half the thickness of the cowl cross-member lower.

* * * * *